United States Patent
Laughlin et al.

(10) Patent No.: US 11,662,041 B2
(45) Date of Patent: May 30, 2023

(54) SUPPORT CLIP (71) Applicant: ERICO INTERNATIONAL CORPORATION, Solon, OH (US)

(72) Inventors: Raymond Scott Laughlin, Middlefield, OH (US); Daniel Kozlowski, North Canton, OH (US)

(73) Assignee: ERICO International Corporation, Solon, OH (US)

(*) Notice: Subject to any disclaimer, the term of this patent is extended or adjusted under 35 U.S.C. 154(b) by 0 days.

(21) Appl. No.: 16/941,183

(22) Filed: Jul. 28, 2020

(65) Prior Publication Data
US 2021/0033220 A1 Feb. 4, 2021

Related U.S. Application Data (60) Provisional application No. 62/969,965, filed on Feb. 4, 2020, provisional application No. 62/879,909, filed on Jul. 29, 2019.

(51) Int. Cl.
*F16L 3/22* (2006.01)
*F16L 3/13* (2006.01)
*F16L 3/237* (2006.01)

(52) U.S. Cl.
CPC .............. *F16L 3/222* (2013.01); *F16L 3/13* (2013.01); *F16L 3/237* (2013.01)

(58) Field of Classification Search
CPC ... F16L 3/222; F16L 3/13; F16L 3/237; F16L 3/221; F16L 3/2235; F16L 3/227;
(Continued)

(56) References Cited

U.S. PATENT DOCUMENTS

| 3,188,030 A | 6/1965 | Fischer |
| 3,554,236 A | 1/1971 | Rhodes |

(Continued)

FOREIGN PATENT DOCUMENTS

| CA | 3043357 A1 | 7/2018 |
| DE | 202005008219 U1 | 3/2006 |

(Continued)

OTHER PUBLICATIONS

CMD Cable Baskets, ergo solutions technical information, 1 page, <www.cmd-ltd.com>.

(Continued)

*Primary Examiner* — Christopher Garft
(74) *Attorney, Agent, or Firm* — Quarles & Brady LLP (57) ABSTRACT

A support clip can be configured to support objects relative to a cable support system having wire members. A support system engagement portion can have first, second, and third attachments, which can be removably attachable to the wire members of the cable support system. The first attachment can define a first partly cylindrical pocket with a first entrance, the second attachment can define a second partly cylindrical pocket with a second entrance, and the third attachment can define a hook that defines a third elongate pocket and a third entrance. The first and second attachments can be configured to receive respective wire members to attach the support clip to the cable support system in a first orientation and the second and third attachments can be configured to receive respective wire members to attach the support clip to the cable support system in a second orientation.

20 Claims, 10 Drawing Sheets

(58) Field of Classification Search
CPC ... F16L 3/24; F16L 3/2431; F16L 3/22; F16L 3/1215; F16L 3/1075; F16L 3/1083; F16L 3/08; F16L 3/243; H02G 3/0456; H02G 3/0443; H02G 3/32; A47B 55/02
USPC ....... 248/68.1, 222.51, 222.52, 305–306, 95, 248/914
See application file for complete search history.

(56) References Cited

U.S. PATENT DOCUMENTS

| | | | |
|---|---|---|---|
| 4,114,241 | A | 9/1978 | Bisping |
| 4,306,697 | A | 12/1981 | Mathews |
| 4,669,688 | A | 6/1987 | Itoh et al. |
| 4,801,061 | A | 1/1989 | Mangone, Jr. |
| 4,801,064 | A | 1/1989 | Mangone, Jr. |
| 5,531,416 | A * | 7/1996 | Remmers ............ A47G 25/0692 248/222.51 |
| 5,624,094 | A * | 4/1997 | Protz, Jr. ................. F16B 45/02 24/601.2 |
| 5,758,851 | A * | 6/1998 | Remmers ............. A47B 96/061 248/222.51 |
| 5,899,041 | A | 5/1999 | Durin |
| 6,073,891 | A * | 6/2000 | Humber .................... F16L 3/13 248/74.5 |
| 6,082,690 | A | 7/2000 | Durin et al. |
| 6,109,569 | A | 8/2000 | Sakaida |
| 6,215,069 | B1 | 4/2001 | Martin et al. |
| 6,378,811 | B1 | 4/2002 | Potter |
| 6,380,484 | B1 | 4/2002 | Theis et al. |
| 6,401,939 | B1 * | 6/2002 | Durin ................... H02G 3/0443 248/68.1 |
| 6,489,556 | B1 | 12/2002 | Jauch et al. |
| 6,494,414 | B2 | 12/2002 | Benito-Navazo |
| 6,504,100 | B2 | 1/2003 | Lawrence et al. |
| 6,513,766 | B1 | 2/2003 | Gretz |
| 6,517,032 | B1 | 2/2003 | Gretz |
| 6,539,161 | B2 | 3/2003 | Holman et al. |
| 6,581,884 | B1 | 6/2003 | Gretz |
| 6,629,676 | B1 | 10/2003 | Gretz |
| 6,655,644 | B1 | 12/2003 | Gretz |
| 6,665,484 | B2 | 12/2003 | Douglas et al. |
| 6,729,606 | B1 * | 5/2004 | Durin ................... H02G 3/0443 254/395 |
| 6,889,944 | B2 | 5/2005 | Brandzel et al. |
| 6,892,020 | B2 | 5/2005 | Douglas et al. |
| 7,097,142 | B1 | 8/2006 | Schmidt |
| 7,182,299 | B2 | 2/2007 | Takeuchi |
| 7,346,252 | B2 | 3/2008 | Krampotich et al. |
| 7,407,138 | B1 | 8/2008 | Gretz |
| 7,484,698 | B2 | 2/2009 | Budagher |
| 7,490,727 | B2 * | 2/2009 | Spiers ................... A47F 7/0028 211/89.01 |
| 7,674,983 | B2 | 3/2010 | Nakamura |
| 7,753,320 | B2 | 7/2010 | Geiger et al. |
| 8,097,808 | B2 | 1/2012 | Quertelet et al. |
| 8,173,903 | B2 * | 5/2012 | Letourneur .......... H02G 3/0443 403/329 |
| 8,882,051 | B2 | 11/2014 | Bleus et al. |
| 9,360,648 | B2 | 6/2016 | Rudenick et al. |
| 9,500,829 | B2 | 11/2016 | Rudenick et al. |
| 9,548,598 | B2 | 1/2017 | Tally et al. |
| 9,556,976 | B1 | 1/2017 | Thompson et al. |
| 9,592,776 | B2 | 3/2017 | Fujita et al. |
| 9,837,185 | B2 | 12/2017 | Korczak et al. |
| 9,951,889 | B2 | 4/2018 | Reed et al. |
| 10,151,406 | B2 | 12/2018 | Netke et al. |
| 10,271,650 | B2 * | 4/2019 | Ebersole ............... A47B 96/06 |
| 10,361,544 | B2 | 7/2019 | Schulte |
| 10,376,059 | B1 * | 8/2019 | Ebersole .............. A47B 61/003 |
| 2005/0173597 | A1 * | 8/2005 | Farrell ................... F16L 3/223 248/68.1 |
| 2005/0247836 | A1 * | 11/2005 | Park ........................ A47F 5/04 248/222.51 |
| 2006/0006292 | A1 | 1/2006 | Kleeb et al. |
| 2009/0224111 | A1 * | 9/2009 | Gilbreath ................ F16L 3/222 248/68.1 |
| 2009/0321588 | A1 * | 12/2009 | Sullivan ................ F16L 3/2431 248/74.2 |
| 2010/0059250 | A1 * | 3/2010 | Letourneur .......... H02G 3/0443 174/135 |
| 2010/0258685 | A1 | 10/2010 | Gardner et al. |
| 2011/0303456 | A1 * | 12/2011 | Blanchard ............... F16L 3/222 248/68.1 |
| 2012/0211609 | A1 | 8/2012 | Mandic |
| 2015/0078809 | A1 | 3/2015 | Winn |
| 2017/0231388 | A1 | 8/2017 | Will et al. |
| 2017/0367481 | A1 * | 12/2017 | Ebersole ................ A47B 96/06 |
| 2018/0115143 | A1 | 4/2018 | Ruddick |
| 2018/0294627 | A1 | 10/2018 | Zitzmann |
| 2018/0366926 | A1 | 12/2018 | Schulte |
| 2019/0081469 | A1 * | 3/2019 | Shea ........................ H02G 3/32 |
| 2019/0214803 | A1 | 7/2019 | Varale |
| 2019/0225169 | A1 | 7/2019 | Leancu |
| 2020/0011453 | A1 * | 1/2020 | Allender-Zivic ......... F16L 3/06 |
| 2020/0099212 | A1 | 3/2020 | Bell et al. |

FOREIGN PATENT DOCUMENTS

| | | |
|---|---|---|
| DE | 202017107104 U1 | 1/2018 |
| DE | 102017100566 A1 | 7/2018 |
| EP | 1406362 B1 | 10/2005 |
| EP | 1542329 B1 | 5/2006 |
| EP | 1605567 B1 | 3/2009 |
| EP | 2388876 B1 | 6/2013 |
| EP | 2501004 B1 | 3/2014 |
| EP | 2541710 B1 | 5/2014 |
| EP | 2704277 B1 | 9/2015 |
| EP | 2808964 B1 | 11/2015 |
| EP | 2811595 B1 | 12/2015 |
| ES | 1066893 Y | 1/2008 |
| ES | 1069184 Y | 11/2008 |
| ES | 2346733 B1 | 4/2010 |
| ES | 2350440 B1 | 5/2010 |
| ES | 2353329 B1 | 10/2010 |
| ES | 1164633 Y | 7/2016 |
| FR | 2812775 A1 | 8/2002 |
| FR | 2857788 B1 | 1/2005 |
| FR | 2812773 B1 | 8/2008 |
| FR | 2919766 A1 | 2/2009 |
| FR | 2947109 B1 | 12/2010 |
| FR | 2836979 B1 | 9/2012 |
| FR | 2836980 B1 | 9/2012 |
| FR | 2843495 B1 | 2/2013 |
| FR | 2817924 B1 | 6/2014 |
| FR | 2812927 B1 | 2/2015 |
| FR | 3029022 B1 | 5/2016 |
| GB | 2447429 A | 9/2008 |
| GB | 2460308 B | 2/2009 |
| JP | H07107644 A | 4/1995 |
| JP | H07231539 A | 8/1995 |
| JP | 4876282 B2 | 2/2012 |
| KR | 2008110948 A | 12/2008 |
| PL | 66341 Y1 | 3/2012 |
| PL | 66882 Y1 | 12/2012 |
| PL | 66883 Y1 | 12/2012 |
| PL | 66885 Y1 | 12/2012 |
| WO | 2005090846 A1 | 9/2005 |
| WO | 2018138422 A1 | 8/2018 |

OTHER PUBLICATIONS

Tamlex Steel Cable Management Systems, product information, 2 pages, <www.tamlex.co.ukm>.
Suppliers and distributors of clamp cable trays, 8 pages, <www.alibaba.com>.

* cited by examiner

SUPPORT CLIP

RELATED APPLICATIONS

This application claims priority under 35 U.S.C 119 from U.S. Provisional Application No. 62/879,909, filed Jul. 29, 2019 and U.S. Provisional Application No. 62/969,965, filed Feb. 4, 2020, which are incorporated herein by reference in their entirety.

BACKGROUND

Power over Ethernet (PoE) is an emerging technology in the industry that transmits both electric power and data connection over a single cable, eliminating the need for a separate power cable to provide electrical power. This is particularly useful for devices such as Voice over Internet Protocol (VoIP) phones, Internet Protocol (IP) cameras, wireless access points (WAPs), etc. that require both data connection and power by eliminating the need to route a second cable for electrical power. As the technology advances, PoE is being used in increasingly higher wattages to power larger and devices requiring more power, such as a TV, which can generate excessive heat along the length of the cables over time, especially when bundled with other cables. Higher wattage applications increase the need to dissipate heat to ensure safe and optimal use. This can include limiting cable bundle size and maintaining proper spacing between bundles.

Contractors are often tasked with retrofitting PoE systems in buildings that have existing cable support systems in place. Being able to use existing cable infrastructure when possible reduces the time and cost associated with installing a new pathway, especially when only installing a small number of cables. However, the existing cable support system is often filled to capacity and there is no room for additional cables.

Further, when installing a new cable support system, installers should keep the future addition of cables in mind when planning and installing cabling pathways. Many municipalities and/or building codes now dictate that new pathways must be installed with additional capacity available for future installation of cables.

SUMMARY

In many applications, it may be useful to support cables from a new or an existing cable support system. Accordingly, there is a need for a support clip that can be installed in an existing cable tray system easily and reliably.

Some embodiments of the invention can provide a support clip for supporting objects relative to a cable support system having wire members. The support clip can include a support system engagement portion having a first attachment, a second attachment, and a third attachment. The first, second, and third attachments can be removably attachable to the wire members of the cable support system. The first attachment can define a first partly cylindrical pocket with a first entrance. The second attachment can define a second partly cylindrical pocket with a second entrance. The third attachment can define a hook that defines a third elongate pocket and a third entrance. The first entrance and the second entrance can face in opposing directions and can be spaced apart a first distance. The second entrance and the third entrance can face in the same direction and can be spaced apart a second distance perpendicular to the first distance. The first and second attachments can be configured to receive respective wire members to attach the support clip to the cable support system in a first orientation and the second and third attachments can be configured to receive respective wire members to attach the support clip to the cable support system in a second orientation.

In some embodiments, the first distance can be along a top portion of the support system engagement portion.

In some embodiments, the second distance can be along a side portion of the support system engagement portion perpendicular to the top portion.

Some embodiments of the invention can provide a support clip for supporting an object relative to sets of parallel wire members. The support clip can include a support system engagement portion with first, second, and third attachments. The support clip can be configured to be attached to the set of parallel wire members in a first orientation and a second orientation, where the first orientation is different than the second orientation. The first and second attachments can be configured to receive a first set of parallel wire members, to secure the support clip to the first set of parallel wire members in the first orientation, via rotation of the support clip about a first axis. The second and third attachments can be configured to receive a second set of parallel wire members, to secure the support clip to the second set of parallel wire members in the second orientation, via rotation of the support clip about a second axis that is perpendicular to the first axis.

Other embodiments of the invention provide a method of attaching a support clip to a support system having wire members. The method can include orienting a support clip in either of a first orientation or a second orientation, with a first attachment and a second attachment of the support clip aligned with a first set of the wire members in the first orientation and a third attachment of the support clip aligned with a second set of the wire members in the second orientation. Selectively securing the support clip to either the first set of the wire members or the second set of the wire members by: with the support clip in the first orientation, rotating the support clip in a first direction, relative to a first axis of rotation through the support clip, to seat wire members of the first set in first and second pockets of the first and second attachments; and with the support clip in the second orientation: inserting a first wire member of the second set into an elongate hook of the third attachment; and after inserting the first wire member into the elongate hook, rotating the support clip in a second direction, relative to a second axis of rotation through the support clip that is perpendicular to the first axis of rotation, to seat a second wire member of the second set into the second pocket.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

A support clip configured to be installed in an existing cable tray system easily and reliably is described herein. Some embodiments of the support clips can be used to quickly bundle cables to an appropriately sized bundle and ensure proper spacing is maintained as required when installing high wattage PoE. For example, some embodiments according to the invention can provide a quick and easy installation of small bundles of cables to the bottom or sides of a cable support system, such as a wire basket tray, without the use of tools or additional fasteners. Wire basket trays generally comprise a series of longitudinal and transverse wires that form a 2 inch by 4 inch grid along the bottom of tray. Wire basket trays 4 inch and deeper also typically have the same 2 inch by 4 inch grid found on the sides of the tray. A support clip according to an embodiment of the invention can enter the grid along the 4 inch spacing, then when given approximately a quarter turn (90 degree), can snap over the wires spaced 2 inches apart, securing the support clip in place. Cables can then be inserted into the support clip through an opening before a latch is closed to secure the cables within the support clip. Multiple support clips can be placed along the bottom and/or sides of the wire basket tray to support multiple bundles of cables.

Some embodiments of the support clip can be configured to gang with another support clip to add additional capacity. For example, protrusions from one support clip can be removably interlocked with apertures in another support clip, providing a gangable (e.g., vertically stackable) support clip assembly. This can be useful for installing multiple bundles of cables where the tray might not be wide enough to accommodate enough supports. This also allows for the addition of more support clips in the future, and it can be used to maintain a distance between supported cable bundles.

Some embodiments of the support clip can provide a set of channels configured to fit into a rail profile of a channel support member. For example, support clips according to embodiments of the invention can fit with support members such as nVent CADDY's Telescoping Screw Gun Bracket (TSGB) for making horizontal trapeze style installations. The support clip can receive the rail profile of the TSGB before the TSGB is fastened to the ceiling. This can be useful when installing multiple runs of cables side-by-side, eliminating the need to fasten each individual support clip.

Some of the discussion below describes a support clip that can be used to support a cable, a bundle of cables, or an electrical conduit to a cable support system. The context and particulars of this discussion are presented as examples only. For example, embodiments of the disclosed invention can be configured in various ways, including with other shapes and arrangements of elements. Similarly, embodiments of the invention can be used with arrangements of cable support structures, electrical brackets, or other assemblies other than those expressly illustrated or described herein.

FIGS. 1-4 illustrate a support clip 100 according to an embodiment of the invention. The support clip 100 includes a support clip body 110 and a support system engagement portion 140. The support clip body 110 and the support system engagement portion 140 can be integrally formed as part of a single component that can be formed from polypropylene. However, other materials are contemplated, such as glass-filled polypropylene.

A support clip body can be provided in different configurations in other embodiments, including as may be helpful to support objects other than cables. For example, as shown in FIGS. 1-5, the support clip body 110 is a cable bundle holder configured to receive and secure a cable or a bundle of cables (not shown). In some embodiments, a support clip body can include other types of supports such as, but not limited to, conduit supports (e.g., conduit clamps), pipe clamps, hooks or other hangers, and so on. In some embodiments, a support clip body can provide an attachment point for attaching other types of removable supports, such as conduit supports or threaded rod.

The support clip body 110 has a top portion 112, a bottom portion 114, a front surface 118, a rear surface 120, and two side surfaces 122, 124. The support clip body 110 further defines a retention portion 126, with a mostly cylindrical shape having a support surface 128, extending from the front surface 118 through the rear surface 120 and further defining an opening 130. An aperture 116 (shown in FIG. 2) extends through the bottom portion 114 on one side of the opening 130.

A latch 160 depends from the support clip body 110 approximate to one side of the opening 130 opposite the aperture 116. The latch 160 can be integrally formed as part of a single component with the support clip body 110 and the support system engagement portion 140. The latch 160 has a retaining strap 162 located on a distal end portion of the latch 160. The latch 160 is configured to hingedly open and close the retention portion 126 and to be secured in a closed position by the retaining strap 162 when received within the aperture 116. When open, the latch 160 is rotated away from the opening 130 providing access to the retention portion 126. When closed, the latch 160 extends across the opening 130 and the retaining strap 162 is removably received within the aperture 116, closing the retention portion 126.

Figure 3:
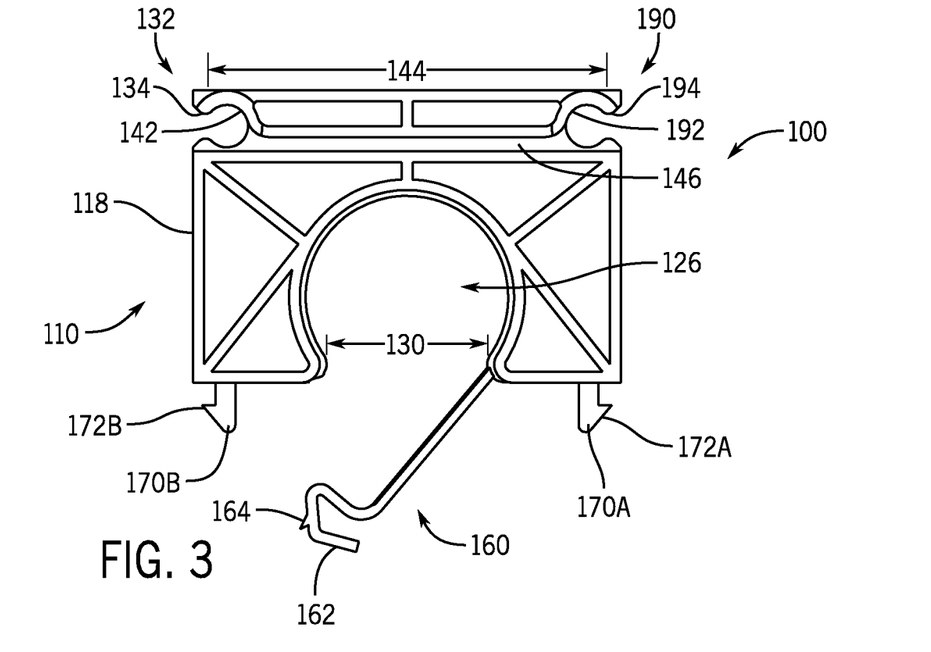
FIG. 3 is a front elevation view of the support clip of FIG. 1.

The retaining strap 162 has a spring-like characteristic allowing it to be securely received within the aperture 116 and also removed therefrom by countering the biasing force exerted by the retaining strap 162 within the aperture 116. As shown in FIG. 3, the retaining strap 162 can have a tooth 164 extending therefrom and configured to engage with the bottom portion 114 after the retaining strap 162 is received within and at least partially through the aperture 116. The tooth 164 provides further retention of the latch 160 when in the closed position.

Figure 14:
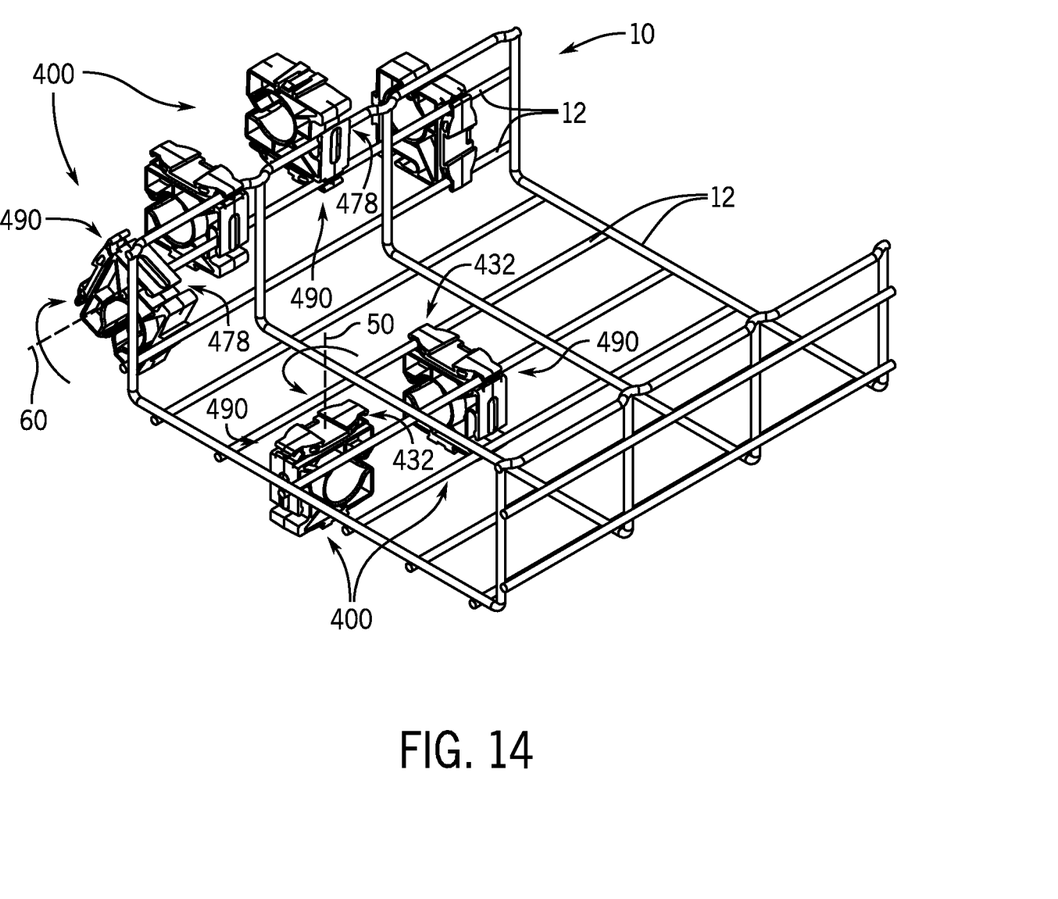
FIG. 14 is an isometric view of a cable support system with six support clips attached thereto according to an embodiment of the invention.

FIGS. 1-4 also illustrate the support system engagement portion 140. The support system engagement portion 140 extends upward from and along the top portion 112. The support system engagement portion 140 has a first attachment 132 defining a first pocket 142 with a first entrance 134 and a second attachment 190 defining a second pocket 192 with a second entrance 194. The first and second attachments 132, 190 are disposed on first and second ends 112a, 112b of the top portion 112. The first and second attachments 132, 190 are configured to receive and engage with parallel wire members 12 of a wire basket tray 10 in a first attachment position (as shown in FIG. 14 with support clip 100). Pockets of attachments for support clips can be partly-cylindrical, including to better receive and accommodate wire members. For example, the pockets 142, 192 are cylindrical over more than 180° of their circumference, as shown, so that the wire members 12 can be snapped into the pockets 142, 192 during installation.

In different embodiments, different spacings between attachments can be provided in order to accommodate particular sets of wire members. For example, a distance 144 between the first and second entrances 134, 194 of the pockets 142, 192 can be generally provided as a particular (e.g., standard) dimension between wires in the wire pattern in the wire basket tray 10. A typical wire basket tray similar to the wire basket tray 10 shown in FIG. 14 has a wire pattern with a dimension of approximately 2 inches by 4 inches. Therefore, the distance 144 may usefully be approximately 2 inches, although other distances are also possible.

Figure 4:
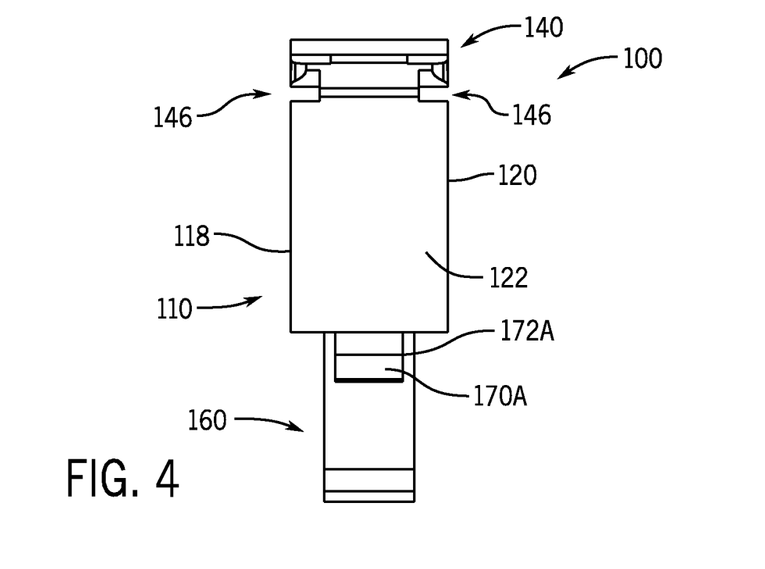
FIG. 4 is a right side elevation view of the support clip of FIG. 1.

As shown in FIGS. 3 and 4 in particular, the support system engagement portion 140 also defines a set of channels 146 extending above and along the top portion 112 of the support clip body 110. The set of channels 146 are configured to fit into a generally C-shaped profile of a channel support member, including strut 20 of standard size. For example, see FIGS. 16 and 17 in which the strut is a telescoping bracket, which has lips 22 on opposing sides of a central channel 24. The set of channels 146 can be parallel and configured to receive the lips 22 of the strut 20 when the top portion 112 is received within the central channel 24 of the strut 20. However, the dimensions of the set of channels 146 should not be viewed as limited to only that application, as other embodiments can be sized and configured to receive other types of support members.

Figure 1:
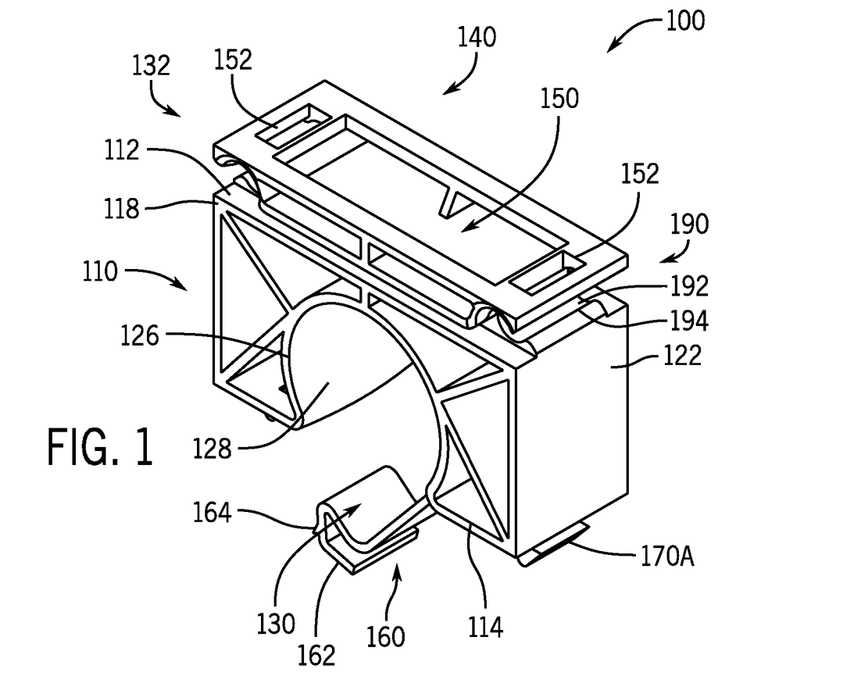
FIG. 1 is a top front isometric view of a support clip according to an embodiment of the invention.
Figure 2:
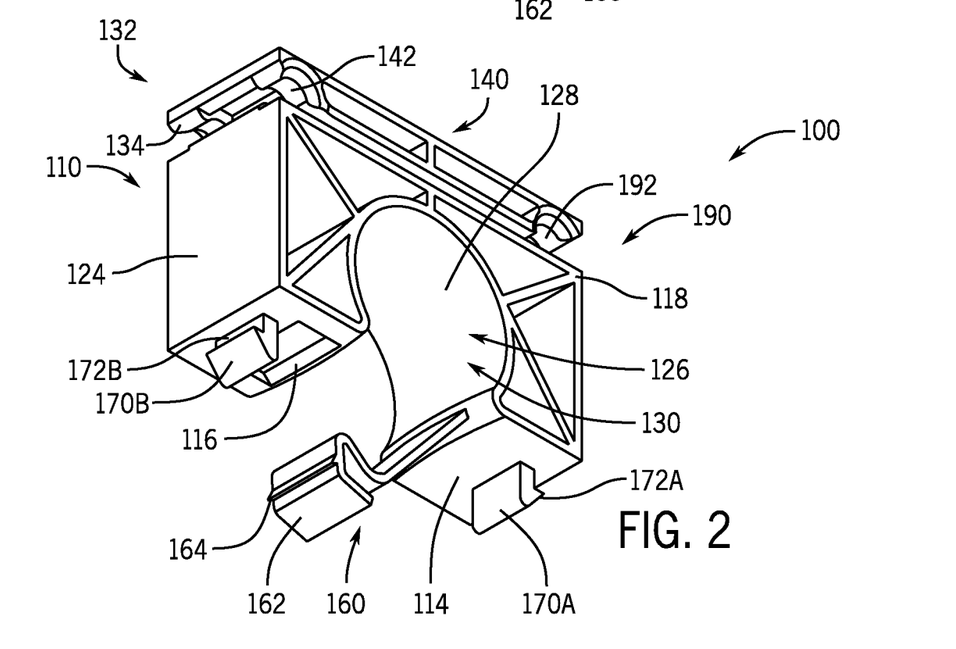
FIG. 2 is a bottom front isometric view of the support clip of FIG. 1.

The support system engagement portion 140 can also define a cavity 150 (shown in FIG. 1). The cavity 150 is sized and configured to receive the latch 160 of a ganged support clip as described below. The support system engagement portion 140 also has a set of retaining openings 152 (shown in FIG. 1) positioned on each side of the cavity 150. In the illustrated example, the retaining openings 152 are separate from the cavity 150, although other configurations are possible (e.g., with retaining openings as extensions of another cavity).

Figure 5:
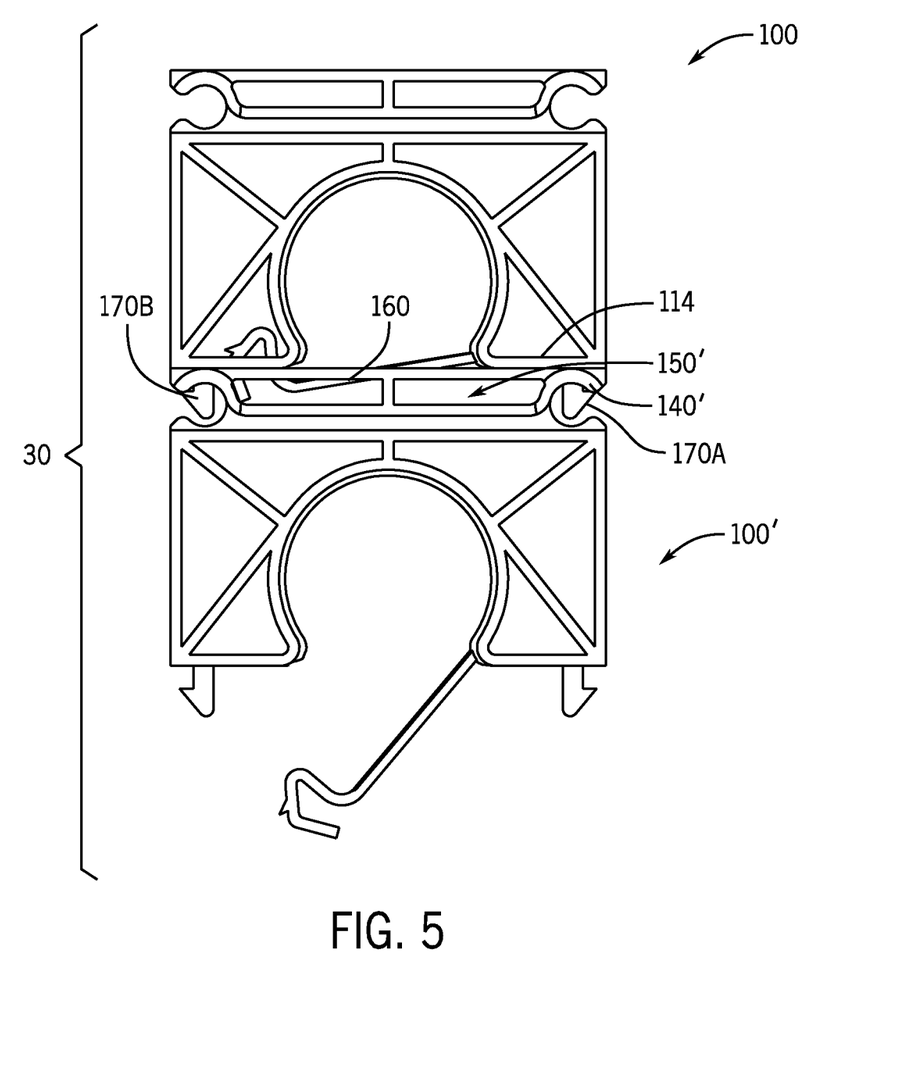
FIG. 5 is a front elevation view of two stacked support clips according to an embodiment of the invention.
Figure 6:
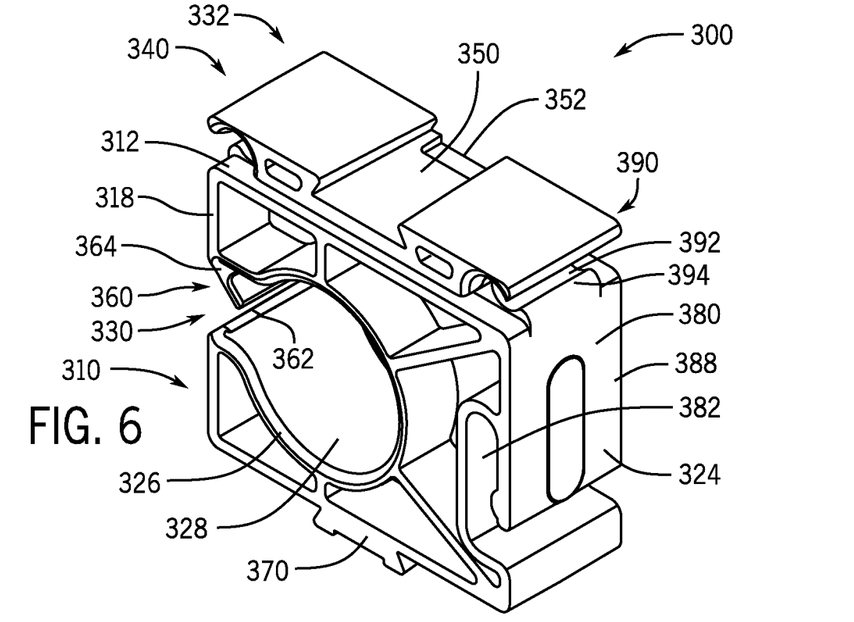
FIG. 6 is a top front isometric view of a support clip according to another embodiment of the invention.
Figure 7:
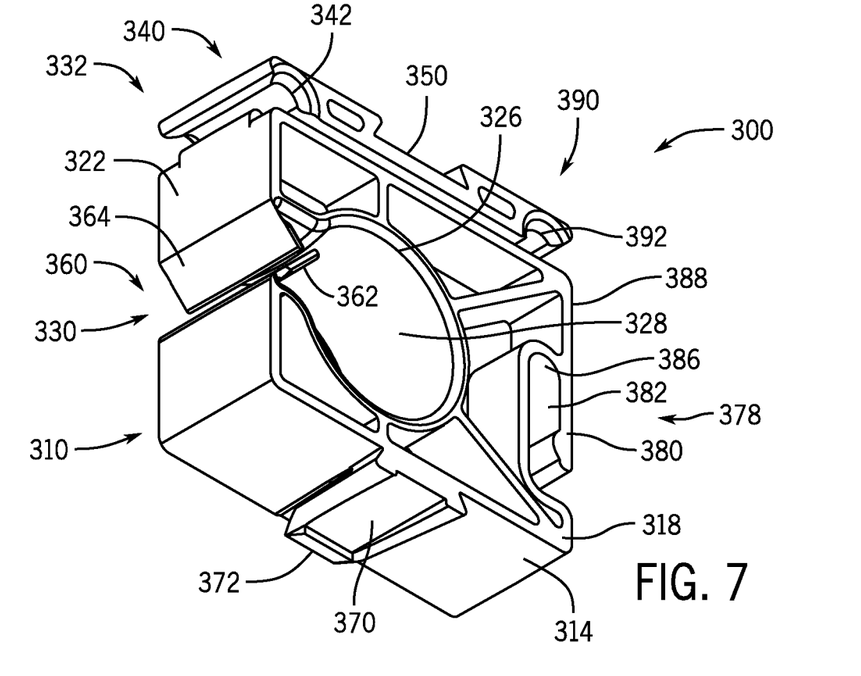
FIG. 7 is a bottom front isometric view of the support clip of FIG. 6.

FIG. 5 illustrates the support clip 100 ganged with another support clip 100' to form a vertically stacked support clip assembly 30. The support clip 100 has a set of protrusions 170 extending downward from the bottom portion 114 configured to be receivable within a set of retaining openings of the other support clip 100' (e.g., similar to the retaining openings 152). In the example embodiment shown in FIGS. 2 and 3, the support clip 100 has two protrusions, designated with an "A" or "B" following the part number 170. Unless a particular protrusion is specifically being described, the protrusions will be discussed below using only their respective part number 170. The protrusions 170 each have a locking tab 172 (shown in FIG. 3) that engages the support system engagement portion 140' of the other support clip 100' when the set of protrusions 170 is received within and at least partially through the set of retaining openings of the other support clip 100'. The cavity 150' provides sufficient clearance to receive the latch 160, to allow the bottom portion 114 to make contact with the support system engagement portion 140' and thereby provide a more rigid assembly.

In some embodiments, at least one protrusion can extend from the top portion and can be configured to be received within a retaining opening in the bottom portion of another support clip. For example, some embodiments, may exhibit a reversed configuration relative to the support clips 100, 100', with protrusions similar to the protrusions 170 extending from top sides thereof and openings similar to the retaining openings 152 extending into bottom sides thereof.

As shown in the figures, both protrusions 170A, 170B are positioned with their respective locking tabs 172A, 172B facing outward (as shown in FIG. 3). According to this embodiment, orienting the protrusions 170 outward reduces the likelihood of interference between the locking tabs 172 and the portion of the support system engagement portion 140' defining the cavity 150' on the other support clip 100'. In other embodiments, however, other configurations are possible.

According to some embodiments of the support clip 100, a minimum distance from the support surface 128 to the nearest of the top portion 112, the bottom portion 114, and the side surfaces 122, 124 is the spacing distance provided in regulations for PoA installations. For example, standards and regulations such as TIA 568/EN 50174-2; ANSI/BICSI D044; ISO/IEC TR 21925; and IEEE 802.3bt provide such required spacing distances. However, other spacing distances are also possible.

FIGS. 6-9 illustrate another embodiment of a support clip 300, as also can be installed on a wire basket tray (e.g., the tray 10 of FIG. 14). In many aspects, the support clip 300 is similar to the support clip 100 described above and similar numbering in the 300 series is used for the support clip 300. For example, the support clip 300 has a support clip body 310 and a support system engagement portion 340. The support clip body 310 has a top portion 312; a bottom portion 314; a retention portion 326 with a support surface 328; a front surface 318; a rear surface 320; two side surfaces 322, 324; and an opening 330. The support system engagement portion 340 has a first attachment 332 defining a first pocket 342 with a first entrance 334, a second attachment 390 defining a second pocket 392 with a second entrance 394, and a set of channels 346. The first and second attachments 332, 390 are disposed on first and second ends 312a, 312b of the top portion 312. Further, a first distance 344 between the first and second entrances 334, 394 can be generally provided as a particular dimension of the wire pattern in the wire basket tray 10 (shown in FIG. 14).

Figure 16:
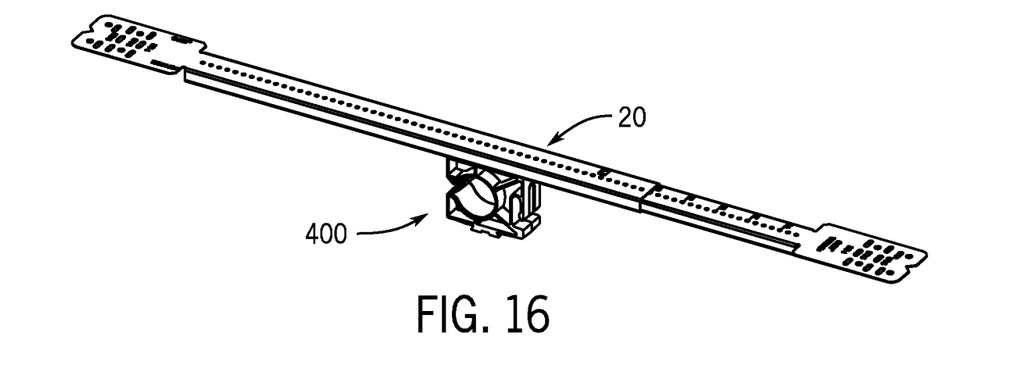
FIG. 16 is an isometric view of a support clip of FIG. 10 attached to a channel support system according to an embodiment of the invention.
Figure 17:
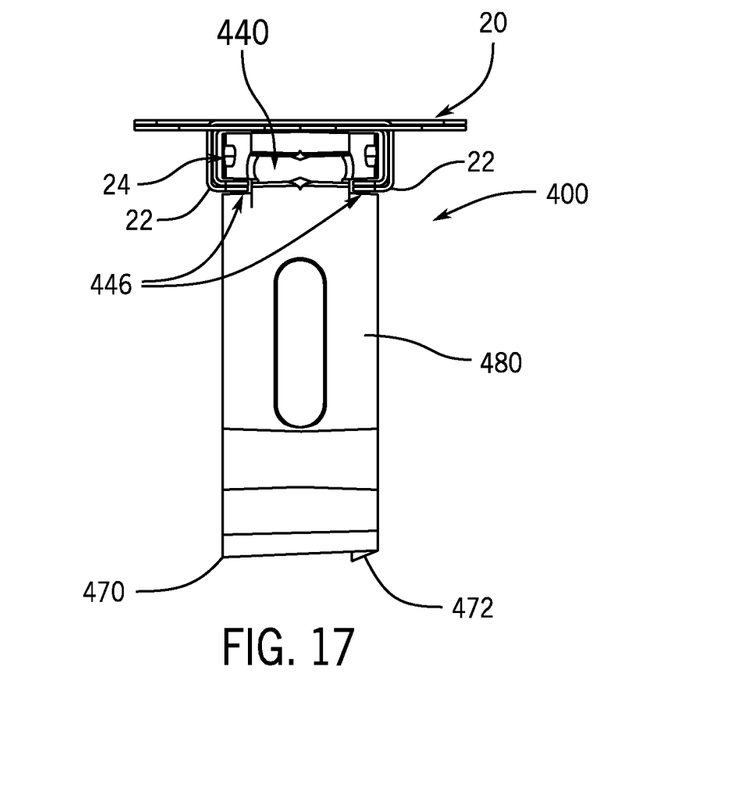
FIG. 17 is a side elevation view of the support clip and channel support system of FIG. 16.

Additionally, the first and second pockets 342, 392 of the support system engagement portion 340 are each configured to receive and engage with parallel wire members in a first attachment position (e.g., as similarly shown in FIG. 14 with a support clip 400 and wire members 12 of the wire basket tray 10). The first and second pockets 342, 392 can be partly-cylindrical to better receive and accommodate the wire members 12. Installation of the support clip 300 to the wire basket tray 10 can be accomplished in a similar manner to that of the support clip 400 described below. Moreover, the set of channels 346 are configured to fit into a generally C-shaped profile of a strut (e.g., the strut 20, as shown in FIGS. 16 and 17 with support clip 400) similarly to the support clip 100. However, similarly to the dimensions of the set of channels 146, the set of channels 346 should not be viewed as limited to only that application, as other embodiments can be sized and configured to receive other types of support members.

In some aspects, however, the support clips 100, 300 differ from each other. For example, the lateral edges of the support surface 328 are radiused. The radiused edges can reduce strain induced on supported cable bundles. Further, the opening 330 faces the same direction as the first entrance 334 (e.g., to the side of the clip 300, as shown). Additionally, the support clip 300 includes a gate 360 with gate members 362, 364 that provide entry for individual cables or a bundle of cables into the retention portion 326 through the opening 330. The gate members 362, 364 extend opposite from each other proximate the opening 330 and are configured to flex towards the retention portion 326 to admit cables (not shown) into the retention portion 326.

In the illustrated embodiment, the gate members 362, 364 are also configured to impede the exit of a cable retained within the retention portion 326 in a one-way-valve-like arrangement. In this regard, for example, the gate members 362, 364 can be arranged to overlap when closed over the opening so that force against the inner most depending gate member 362 by a retained cable inside the retention portion 326 will cause the gate member 362 to contact the outermost depending gate member 364 and prevent the retained cable from exiting. However, if desired, the gate members 362, 364 can be manipulated to allow removal of the cable or bundle of cables by bending both of the gate members 362, 364 inwards to unblock the opening 330.

Figure 8:
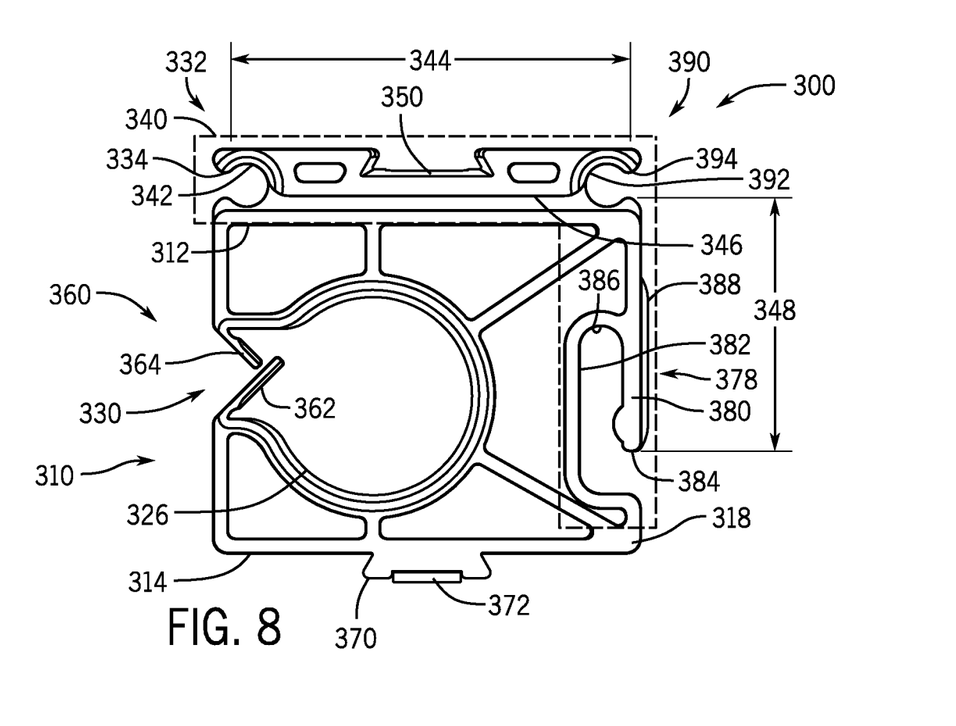
FIG. 8 is a front elevation view of the support clip of FIG. 6.
Figure 9:
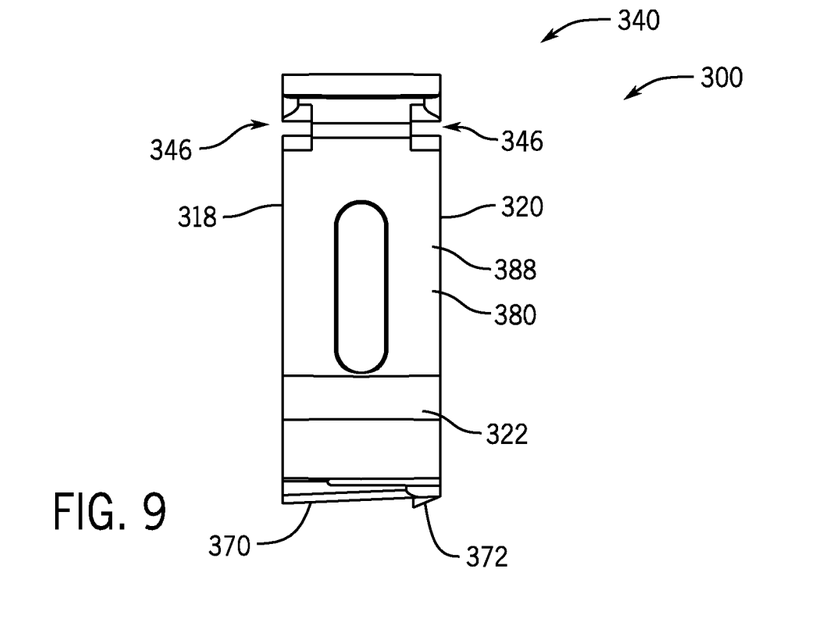
FIG. 9 is a right side elevation view of the support clip of FIG. 6.

Further, a third attachment 378 defines a hook 380 defining a third pocket 382 with a third entrance 384 (see, e.g., FIG. 8). The third attachment 378 is disposed on a side portion 388, adjacent the second end 112b of the top portion 312. The hook 380 is provided opposite the gate 360 and is configured to allow entry of a wire member 12 of the basket tray 10 through the third entrance 384 and into the third pocket 382. The third entrance 384 faces in the same direction as the second entrance 394. A second distance 348 between the second and third entrances 394, 384 can be generally provided as a particular dimension of the wire pattern in the wire basket tray 10 (shown in FIG. 14). As shown, the first distance 344 and the second distance 348 are different, although other configurations are possible and the third pocket 382 itself can accommodate wire pattern dimensions different from the distance 348. For example, in the illustrated example, the third pocket 382 is elongate, extending from the third entrance 384 to towards the second pocket 392 in an elongate direction between the third entrance 384 and a blind end 386. Thus, the third pocket 382 can engage a wire at a variety of locations, including seated against the blind end 386 or otherwise.

The hook 380 can be utilized to attach the support clip 300 to the wire basket tray 10 in a second attachment orientation that is different from the attachment orientation utilized with the first and second attachments 332, 390. Similarly to the configuration shown in FIG. 14 with support clip 400, for example, wherein one wire member can be received within the pocket 380 and the support clip 300 can then be rotated to receive another wire member within the second pocket 392. With the wire members oriented in parallel to each other, the first attachment orientation (i.e., utilizing the attachments 332, 390) is thus rotated ninety degrees relative to the second attachment orientation (i.e., utilizing the attachments 390, 378). Further, the support clip 300 has a protrusion 370 with a locking tab 372 extending from the bottom portion 314 and the support system engagement portion 340 can also define a retaining opening 350 with a recessed portion 352 (shown in FIG. 6). The protrusion 370 and the locking tab 372 are flexible relative to the bottom portion 314 (e.g., configured with a living hinge). The protrusion 370 is configured to be received and retained within the retaining opening of a ganged support clip and, when fully engaged, the locking tab 372 is received within the recessed portion of the ganged support clip (e.g., as similarly shown in FIG. 15 with support clips 400, 400').

In some embodiments, the protrusion 370 and the retaining opening 350 can be sized and configured in a complementary dovetail joint configuration to further aid in alignment and retention of the connection and provide a more rigid assembly. In some embodiments, at least one protrusion can extend from the top portion and can be configured to be received within a retaining opening in the bottom portion of another support clip (e.g., in a reversed configuration than is shown for the clip 300).

FIGS. 10-17 illustrate another embodiment of a support clip 400, as also can be installed with parallel wire members (e.g., with the wire basket tray 10). In many aspects, the support clip 400 is similar to the support clip 300 described above and similar numbering in the 400 series is used for the support clip 400. For example, the support clip 400 has a support clip body 410 and a support system engagement portion 440. The support clip body 410 has a top portion 412; a bottom portion 414; a retention portion 426 with a support surface 428 with a radiused edge; a front surface 418; a rear surface 420; two side surfaces 422, 424; and an opening 430. The support system engagement portion 440 has a first attachment 432 defining a first pocket 442 with a first entrance 434, a second attachment 490 defining a second pocket 492 with a second entrance 494 facing in the opposite direction of the first entrance 434, a third attachment 478 defining a hook 480 defining a third pocket 482 with a third entrance 484 facing in the same direction as the second entrance 494 and a blind end 486, and a set of channels 446. Further, a first distance 444 between the first and second entrances 434, 494 and a second distance 448 between the second and third entrances 494, 484 can be generally provided as a particular dimension of the wire pattern in the wire basket tray 10 (shown in FIG. 14).

Further, the first and second pockets 442, 492 of the support system engagement portion 440 are each configured to receive and engage with wire members 12 of the wire basket tray 10 in a first attachment orientation (as shown at the bottom and top far corner of the tray 10 in FIG. 14) and can be partly-cylindrical to better receive and accommodate the wire members 12. The third pocket 484 is elongate and configured to receive and engage with a wire member 12 along with the second pocket 492 to attach to the wire basket tray 10 in a second attachment orientation (e.g., as shown along the side of the tray 10 in FIG. 14).

Moreover, the set of channels 446 are configured to fit into a generally C-shaped profile of the channel support member 20 (as shown in FIGS. 16 and 17) similar to the support clip 300. However, similarly to the dimensions of the set of channels 346, the set of channels 446 should not be viewed as limited to only that application, as other embodiments can be sized and configured to receive other types of support members.

The support clip 400 also includes a gate 460 with gate members 462, 464 that provide entry for individual cables or a bundle of cables into the retention portion 426 through the side surface 422 and impede an exit therefrom.

Figure 10:
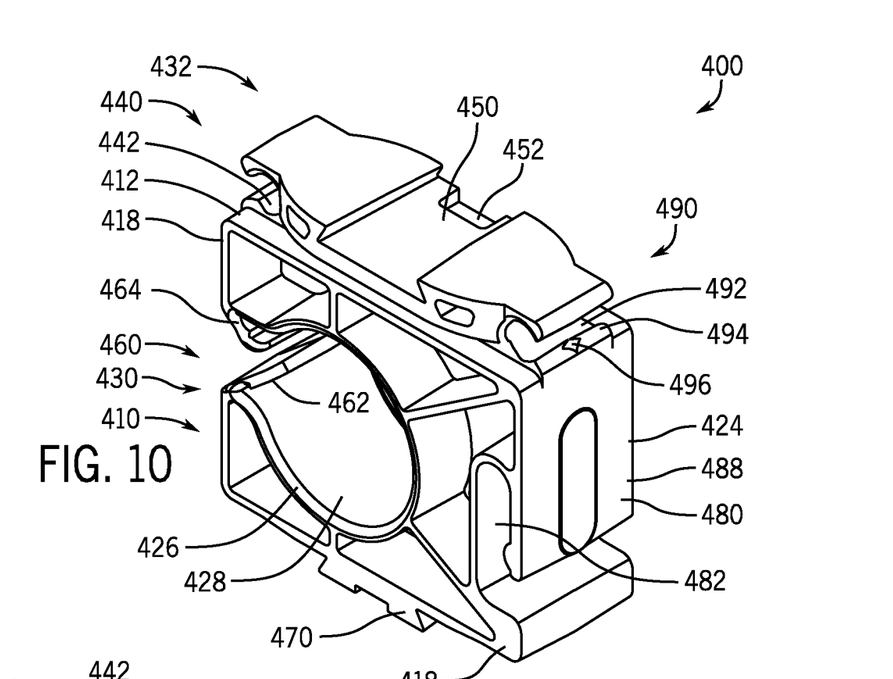
FIG. 10 is a top front isometric view of a support clip according to another embodiment of the invention.
Figure 11:
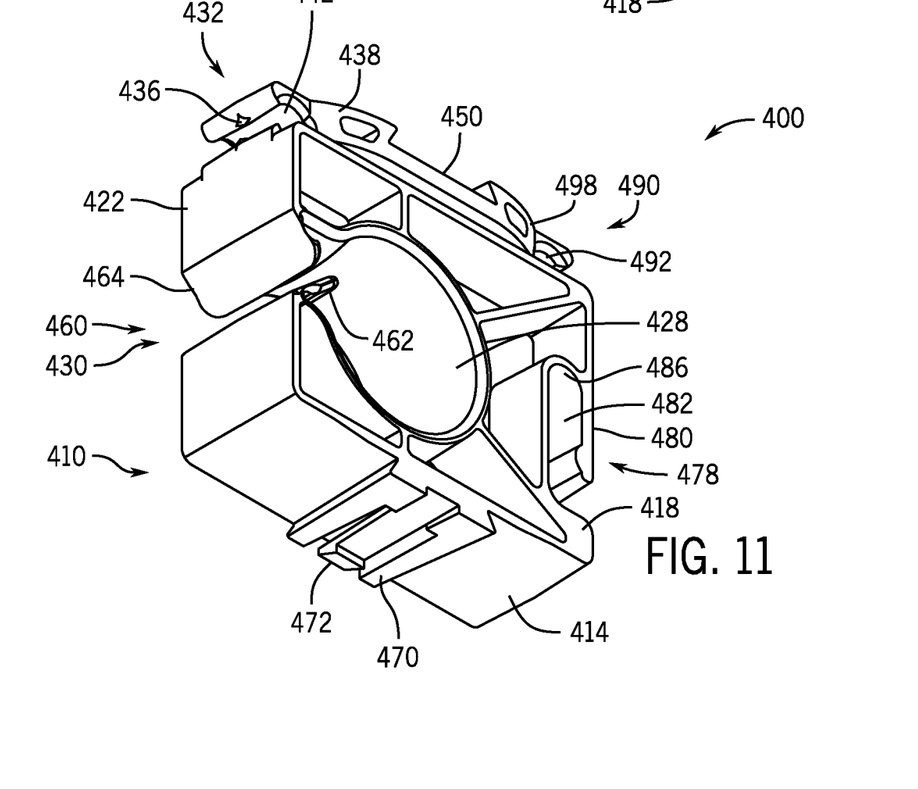
FIG. 11 is a bottom front isometric view of the support clip of FIG. 10.
Figure 12:
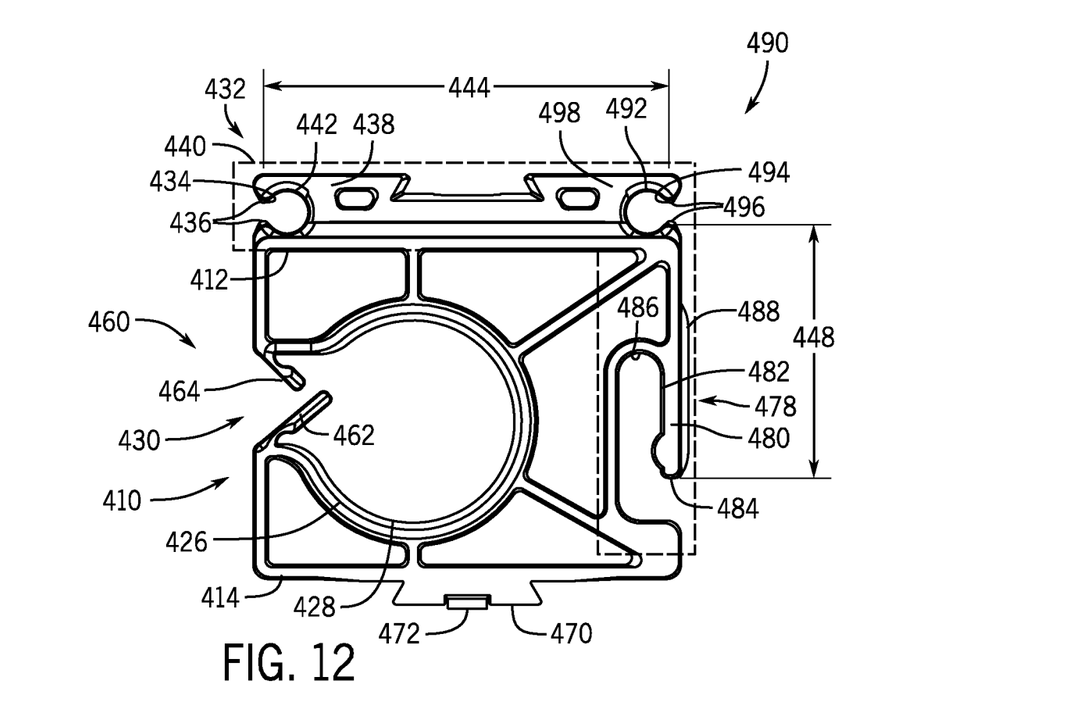
FIG. 12 is a front elevation view of the support clip of FIG. 10.
Figure 13:
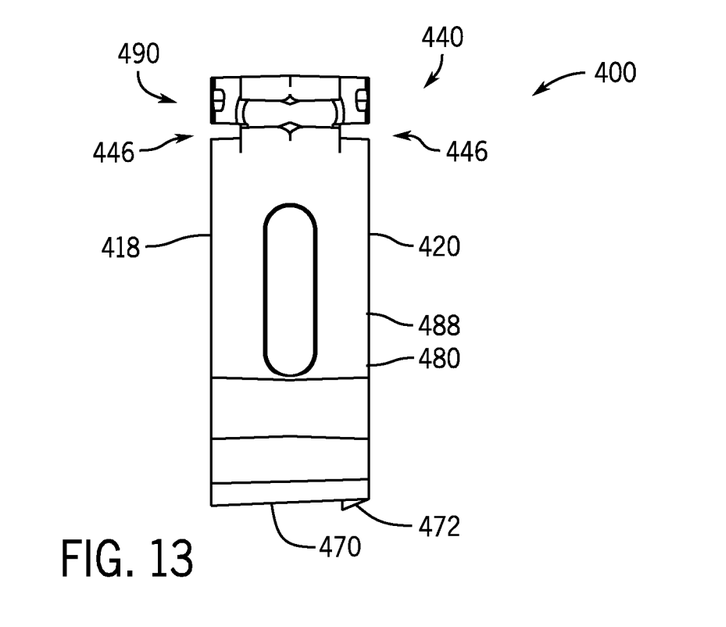
FIG. 13 is a right side elevation view of the support clip of FIG. 10.

In some aspects, however, the support clips 300, 400 differ from each other. For example, as shown in FIG. 11 in particular, the first attachment 432 includes guide surfaces 438 defining a lateral reduction in width of the first attachment 432 (i.e., as measured left-to-right from the perspective of FIG. 13), leading into opposite lateral ends of the first pocket 442. The second attachment 490 similarly has guide surfaces 498. Further, a first set of opposing nubs 436 are centrally located, relative to a lateral direction across the first pocket 442, at the first entrance 434. Similarly, a second set of opposing nubs 496 are centrally located at the second entrance 494. The nubs 496 can help to further secure wire members within the pockets 442, 492, with the vertically opposed, centrally located, and tapered configuration, as seen in FIGS. 10 and 11, providing a particularly favorable balance between retention force and ease of entry. For example, the central location and tapered configuration can allow wire members to enter the pockets 442, 492 easily as the wires are guided into the entrances 434, 494 by the guide surfaces 438, 498, while the protruding height in opposing directions can help to secure the wires in place after installation.

Figure 15:
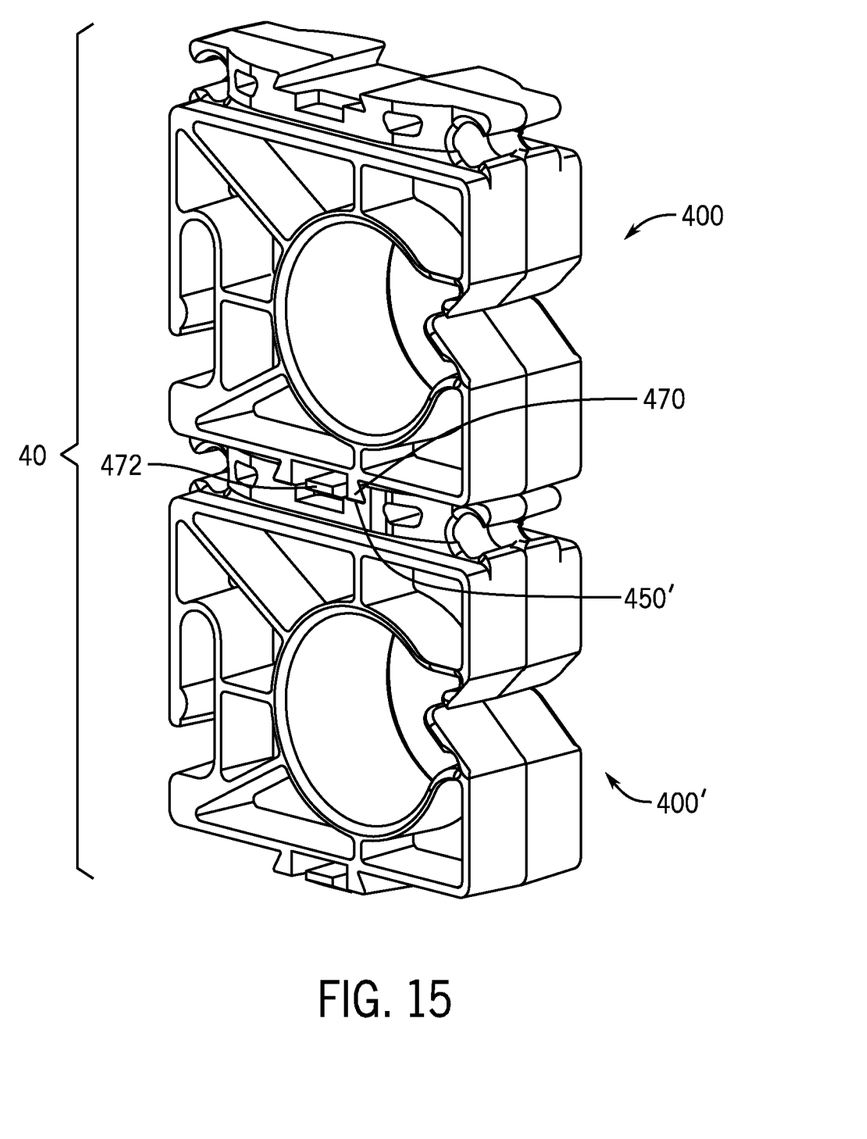
FIG. 15 is a front elevation view of two stacked support clips of FIG. 10 according to an embodiment of the invention.

The support clip 400 also has a protrusion 470 with a locking tab 472 extending from the bottom portion 414 and the support system engagement portion 440 can also define a retaining opening 450 with a recessed portion 452 (shown in FIG. 10). The protrusion 470 and the retaining opening 450 are configured to allow ganging of multiple support clips 400. For example, FIG. 15 shows a protrusion 470 of the support clip 400 received within a retaining opening 450' of another support clip 400' to provide a vertically stacked support clip assembly 40. The protrusion 470 is fixed across the bottom portion 414 and the locking tab 472 is flexible relative to both the protrusion 470 and the bottom portion 414. This increases the load that can be carried by the protrusion 470.

In other embodiments, other configurations are possible. For example, certain features and combinations of features that are presented with respect to the particular embodiment in the discussion above, can be utilized in other embodiments and in other combinations, as appropriate. In this regard, for example, different configurations of the support clip features including the support system engagement portions, latches, gangable elements, and so on, as presented with respect to the support clips 100, 300, 400, can be implemented in any combination in other embodiments.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

For example, with reference to FIG. 14, installation of the support clip 400 to wire members 12 of the wire basket tray 10 in both the first and second attachment orientations is shown. In some embodiments, the support clip 400 can be orientated in either a first orientation or a second orientation, depending, for example, on a desired orientation of the gate 460.

In the first orientation, a first attachment 432 and a second attachment 490 of the support clip 400 are aligned with a first set of wire members 12. The support clip 400 can then be selectively secured to the first set of wire members by rotating the support clip in a first direction, relative to the first axis of rotation 50, to seat the first set of wire members within the first and second pockets 442, 492 of the first and second attachments 432, 490.

In the second orientation, the third attachment 478 is aligned with a first wire member of a second set of wire members 12. The first wire member of the second set of wire members can then be inserted into and moved along the elongate hook 480 of the third attachment 478, potentially including snapping the wire past a retaining protrusion within the pocket 484 defined by the hook 480. After inserting the first wire member into the elongate hook 480, the support clip 400 can be rotated relative to the second axis of rotation 60, perpendicular to the first axis of rotation 50, to seat a second wire of the second set of wire members into the second pocket 492.

In both the first and second attachment orientations of the support clip 400, two of the three attachments 432, 490, 478 can be configured to be attached to the wire basket tray 10 at any one time. For example, as shown in FIG. 14, the first and second attachments 432, 490 are attached to the wire basket tray 10 in the first orientation, and in the second orientation, the second and third attachments 490, 478 are attached to the wire basket tray 10. Further, one of the three attachments 432, 490, 478 can be configured to be attached to the wire basket tray 10 in both the first and second attachment orientations. For example, as shown in FIG. 14, the second attachment 490 is attached to a wire member 12 of the wire basket tray 10 in both the first and second attachment orientations.

Thus, embodiments of the invention provide improved securement of conduit or cables to a cable support system such as a wire basket tray or a channel support member. In some embodiments, support clips according to the invention can substantially reduce the time and labor that may be required during installation and use, such as by obviating the need to install new cable support systems. Further, some embodiments of the invention can be installed before or after the conduit or cable is installed.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

We claim:

1. A support clip for supporting objects relative to a cable support system having wire members, the support clip comprising:
    a support system engagement portion having a first attachment and a second attachment, the first and second attachments adapted to removably attach to the wire members of the cable support system;
    a retaining opening in one of a top portion or a bottom portion of the support clip, and a protrusion extending from the other of the bottom portion or the top portion;
    the first attachment defining a first pocket with a first entrance;
    the second attachment defining a second pocket with a second entrance;
    the first entrance and the second entrance facing in opposing directions and being spaced apart a first distance; and
    the first and second attachments being adapted to receive respective wire members into the first and second pockets via the first and second entrances to attach the support clip to the cable support system in a first orientation;
    wherein the first attachment is adapted to receive the respective wire member with an axial direction of the wire member in parallel with a lateral direction of the support clip;
    wherein the first attachment has guide surfaces defining a lateral reduction in width of the first pocket, from a perspective moving from the second attachment toward the first attachment and
    wherein the support clip is adapted to be stackable with another support clip, with the protrusion of the support clip adapted to be received within a retaining opening of the other support clip.

2. The support clip of claim 1, further comprising:
    a third attachment included in the support system engagement portion and adapted to removably attach to the wire members of the cable support system, the third attachment defining a hook that defines a third pocket and a third entrance, the second entrance and the third entrance facing in the same direction and being spaced apart a second distance perpendicular to the first distance, and the second and third attachments being adapted to receive respective wire members into the second and third pockets via the second and third entrances to attach the support clip to the cable support system in a second orientation; and
    a cable bundle holder coupled to the support system engagement portion, the cable bundle holder defining a retention portion and an opening;
    wherein the third pocket extends in an elongate direction towards the second entrance, and is longer than the third entrance in the elongate direction as measured between the third entrance and a blind end of the third pocket.

3. The support clip of claim 2, further comprising a first gate and a second gate opposingly extending proximate the opening, with the first and second gates being adapted to flex towards the retention portion to admit cables into the retention portion and to overlap when closed over the opening to retain the cables in the retention portion.

4. The support clip of claim 1, wherein the protrusion has a locking tab adapted to engage with a recessed portion of the retaining opening to secure the protrusion in the retaining opening.

5. The support clip of claim 1, further comprising:
    a third attachment included in the support system engagement portion and adapted to removably attach to the wire members of the cable support system, the third attachment defining a hook that defines a third pocket and a third entrance, the second entrance and the third entrance facing in the same direction and being spaced apart a second distance perpendicular to the first distance, and the second and third attachments being adapted to receive respective wire members into the second and third pockets via the second and third entrances to attach the support clip to the cable support system in a second orientation;
    wherein the third pocket extends in an elongate direction towards the second entrance, and is longer than the third entrance in the elongate direction as measured between the third entrance and a blind end of the third pocket; and
    wherein the first distance is different from the second distance.

6. The support clip of claim 1,
    wherein a first set of opposing nubs are centrally located, relative to a lateral direction across the first pocket, at the first entrance.

7. The support clip of claim 1, further comprising:
    a third attachment included in the support system engagement portion and adapted to removably attach to the wire members of the cable support system, the third attachment defining a hook that defines a third pocket and a third entrance, the second entrance and the third entrance facing in the same direction and being spaced apart a second distance perpendicular to the first distance, and the second and third attachments being adapted to receive respective wire members into the second and third pockets via the second and third entrances to attach the support clip to the cable support system in a second orientation;

wherein the third pocket extends in an elongate direction towards the second entrance, and is longer than the third entrance in the elongate direction as measured between the third entrance and a blind end of the third pocket; and wherein the second pocket defines a second pocket volume and the third pocket defines a third pocket volume, wherein the third pocket volume is at least two times the second pocket volume.

8. The support clip of claim 1, for use with a strut having lips on opposing sides of a central channel, wherein a top portion defines a set of parallel channels adjacent the support system engagement portion and extending between the first and second pockets, the set of parallel channels being adapted to receive the lips of the strut when the top portion is received in the central channel of the strut.

9. A support clip for supporting an object relative to sets of parallel wire members, the support clip comprising:
   a support system engagement portion with first, second, and third attachments;
   the support clip being configured to be attached to the sets of parallel wire members in a first orientation and a second orientation, wherein the first orientation is different than the second orientation;
   the first and second attachments being configured to receive a first set of parallel wire members, to secure the support clip to the first set of parallel wire members in the first orientation, via rotation of the support clip about a first axis; and
   the second and third attachments being configured to receive a second set of parallel wire members, to secure the support clip to the second set of parallel wire members in the second orientation, via rotation of the support clip about a second axis that is perpendicular to the first axis,
   wherein a top portion of the support clip defines a set of parallel channels adjacent the support system engagement portion and extending between the first and second attachments, the set of parallel channels being configured to receive lips of a strut when the top portion of the support clip is received in a central channel of the strut.

10. The support clip of claim 9, wherein with the first and second sets of parallel wire members oriented parallel to each other, the first orientation of the support clip is rotated ninety degrees relative to the second orientation of the support clip.

11. The support clip of claim 9, wherein the first and second attachments are configured as first and second pockets, respectively, the first pocket opening in a different direction than the second pocket.

12. The support clip of claim 11, wherein the third attachment is configured as a hook that defines a third pocket; and
   wherein the third pocket extends in an elongate direction towards the second pocket, between an entrance to the third pocket and a blind end of the third pocket.

13. The support clip of claim 12, wherein the first and second pockets open in opposing directions; and
   wherein the entrance to the third pocket opens in the same direction as the second pocket.

14. The support clip of claim 9, wherein the first and second attachments are disposed on first and second ends of a first side of the support clip;
   wherein the third attachment is disposed on a second side of the support clip that is adjacent to the second end of the first side of the support clip; and
   wherein the first side includes one of a protrusion or a retaining opening and a third side of the support clip, opposite the first side, includes the other of the retaining opening or the protrusion, each of the protrusion or retaining opening being configured to engage a complementary retaining opening or protrusion on another support clip to form a stacked support clip assembly.

15. A support clip for supporting an object relative to sets of parallel wire members, the support clip comprising:
   a body that defines a first axis and a second axis;
   a support system engagement portion with first, second, and third attachments;
   the support clip being adapted to be attached to the sets of parallel wire members in a first orientation and a second orientation, wherein the first orientation is different than the second orientation;
   the first and second attachments being adapted to receive a first set of parallel wire members, to secure the support clip to the first set of parallel wire members in the first orientation, via rotation of the support clip about the first axis; and
   the second and third attachments being adapted to receive a second set of parallel wire members, to secure the support clip to the second set of parallel wire members in the second orientation, via rotation of the support clip about the second axis,
   wherein the first and second attachments are disposed on first and second ends of a first side of the support clip;
   wherein the third attachment is disposed on a second side of the support clip that is adjacent to the second end of the first side of the support clip and forms a hook that defines a pocket extending in an elongate direction along the second side of the support clip;
   wherein a distance between a first entrance to the first attachment and a second entrance to the second attachment extends along a first direction; and
   wherein the elongate direction extends perpendicularly to the first direction.

16. The support clip of claim 15, wherein the first attachment includes a first pocket with a first blind end and the first entrance to receive a first wire that extends laterally across the support clip, and the second attachment includes a second pocket with a second blind end and the second entrance to receive a second wire that extends in parallel with the first wire, laterally across the support clip; and
   wherein each of the first and second attachments has lateral guide surfaces that define a reduction in the lateral width of the respective first or second pocket from a perspective moving from the respective first or second blind end to the respective first or second entrance.

17. The support clip of claim 1, wherein the first pocket is cylindrical, with a first radius, over a circumferential extent spanning more than 180°; and
   wherein the second pocket is cylindrical, with the first radius, over a circumferential extent spanning more than 180°.

18. The support clip of claim 15, wherein the first and second attachments are configured as first and second pockets, respectively, the first pocket opening in a different direction than the second pocket.

19. The support clip of claim 18, wherein the third attachment is configured as a hook that defines a third pocket; and
    wherein the third pocket extends in an elongate direction towards the second pocket, between an entrance to the third pocket and a blind end of the third pocket.

20. The support clip of claim 19, wherein the first and second pockets open in opposing directions; and
    wherein the entrance to the third pocket opens in the same direction as the second pocket.

* * * * *